US012307363B2

(12) United States Patent
Park et al.

(10) Patent No.: US 12,307,363 B2
(45) Date of Patent: May 20, 2025

(54) ELECTRONIC DEVICE AND LEARNING METHOD FOR LEARNING OF LOW COMPLEXITY ARTIFICIAL INTELLIGENCE MODEL BASED ON SELECTING DYNAMIC PREDICTION CONFIDENCE THRESHOLD

(71) Applicant: Korea University Research and Business Foundation, Seoul (KR)

(72) Inventors: Jong Sun Park, Seoul (KR); Dong Yeob Shin, Seoul (KR); Geon Ho Kim, Gunpo-si (KR); Joong Ho Jo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 982 days.

(21) Appl. No.: 17/372,701

(22) Filed: Jul. 12, 2021

(65) Prior Publication Data

US 2022/0019891 A1    Jan. 20, 2022

(30) Foreign Application Priority Data

Jul. 17, 2020   (KR) .................. 10-2020-0089217
May 17, 2021   (KR) .................. 10-2021-0063139

(51) Int. Cl.
*G06N 3/08*   (2023.01)
*G06F 18/10*   (2023.01)
*G06F 18/214*   (2023.01)

(52) U.S. Cl.
CPC ............... *G06N 3/08* (2013.01); *G06F 18/10* (2023.01); *G06F 18/214* (2023.01)

(58) Field of Classification Search
CPC .......... G06N 3/08; G06N 3/045; G06N 3/084; G06F 18/10; G06F 18/214
See application file for complete search history.

(56) References Cited

U.S. PATENT DOCUMENTS

2020/0193288 A1*   6/2020   Li ...................... G06N 3/045
2021/0034972 A1    2/2021   Oh et al.

FOREIGN PATENT DOCUMENTS

| KR | 10-2003-0083450 A | 10/2003 |
| KR | 10-2019-0098106 A | 8/2019 |
| KR | 10-2019-0098107 A | 8/2019 |
| KR | 10-2019-0118387 A | 10/2019 |

OTHER PUBLICATIONS

Ganin Y, Lempitsky V. Unsupervised domain adaptation by backpropagation. International conference on machine learning Jun. 1, 2015 (pp. 1180-1189). PMLR. (Year: 2015).*
Amos, Brandon, Vladlen Koltun, and J. Zico Kolter. "The limited multi-label projection layer." arXiv preprint arXiv:1906.08707 (2019). (Year: 2019).*
Preview On Structures and Algorithms of Deep Learning (Year: 2014).*

* cited by examiner

*Primary Examiner* — Omar F Fernandez Rivas
*Assistant Examiner* — Shamcy Alghazzy
(74) *Attorney, Agent, or Firm* — NSIP Law

(57) ABSTRACT

The present invention is related to the electronic device and learning method for learning of low complexity artificial intelligence model based on selecting dynamic prediction confidence threshold.

10 Claims, 7 Drawing Sheets

ELECTRONIC DEVICE AND LEARNING METHOD FOR LEARNING OF LOW COMPLEXITY ARTIFICIAL INTELLIGENCE MODEL BASED ON SELECTING DYNAMIC PREDICTION CONFIDENCE THRESHOLD

CROSS-REFERENCE TO RELATED APPLICATIONS

This application claims priority under 35 U.S.C. § 119 to Korean Patent Application No. 10-2021-0063139 filed on May 17, 2021, and Korean Patent Application No. 10-2020-0089217 filed on Jul. 17, 2020 in the Korean Intellectual Property Office, the disclosures of which are incorporated by reference herein in their entireties.

BACKGROUND

Embodiments of the present disclosure described herein relate to an electronic device and method for learning of a low-complexity artificial intelligence model based on selection of a dynamic prediction confidence threshold.

DNN (deep neural network) represents the best performance in various applications such as image recognition/classification and object detection based on many parameters and computational amount. A large amount of computation is required to allow DNN to learn many parameters, and a long time of days/weeks is required for DNN learning. To reduce the learning time and learning energy consumption, it is effective to reduce the amount of computation required for learning itself.

Mini-batch gradient descent, which is commonly used for learning of DNN, inherently includes noise, and thus it is possible to approximate computation required for learning without necessarily calculating it accurately. Conventional DNN learning requires a very large amount of computation, so there is a problem that it consumes a long learning time and a lot of learning energy. It will be possible to reduce the amount of computation required for overall learning if it is possible to apply an effective approximation to a relatively insignificant computation by distinguishing between significant computation and insignificant computation for learning, based on the mini-batch gradient descent method.

SUMMARY

Embodiments of the present disclosure provide an electronic device and a method for learning of a low-complexity artificial intelligence model based on dynamic prediction confidence threshold selection capable of reducing the overall learning computation amount and learning energy and minimizing influence on learning by omitting computation for the amount of a change in weight for an image having little error (that is, having high prediction confidence) caused by omission of computation within an allowable noise range set by a user, by utilizing the noise-tolerant nature of learning through mini-batch gradient descent.

Embodiments of the present disclosure provide an electronic device and a method for learning of a low-complexity artificial intelligence model based on dynamic prediction confidence threshold selection in which a user is able to adjust the degree of omission of the amount of a change in weight through dynamic prediction confidence threshold selection.

Technical problems to be achieved in various examples of the present disclosure are not limited to those mentioned above, and other technical problems not mentioned can be considered by those of ordinary skill in the art from various examples of the present disclosure to be described below.

According to an exemplary embodiment, an electronic device includes at least one processor, and at least one memory operatively coupled to the at least one processor to store at least one instruction for causing the at least one processor to perform operations, wherein the operations include performing a learning operation of an artificial intelligence model that predicts a label with respect to input data stored in the at least one memory, and the learning operation includes obtaining a prediction confidence value for the label by performing a forward propagation operation on the input data in units of mini-batch, the mini-batch having "B" pieces of sub-input data included in the input data and "B" being a natural number, performing a backward propagation operation only on sub-input data whose prediction confidence value is equal to or greater than a prediction confidence threshold among the pieces of sub-input data to obtain an approximate weight gradient for a weight of the artificial intelligence model, and updating the weight based on the approximate weight gradient.

The learning operation may include omitting the backward propagation operation for the sub-input data whose prediction confidence value is less than the prediction confidence threshold among the pieces of sub-input data.

The learning operation may include a prediction confidence threshold setting operation of setting the prediction confidence threshold, and the prediction confidence threshold setting operation may include operation (a) of initializing a random prediction confidence threshold and RSEskip, the RSEskip being a weight gradient error value according to the omission of the backward propagation operation, operation (b) of decreasing the random prediction confidence threshold by a specific variation value unit, and calculating the RSEskip whenever the random prediction confidence threshold decreases by the specific variation value unit, operation (c) of repeatedly performing the operation (b) until the RSEskip first becomes equal to or exceeds a preset error boundary value; and operation (d) of setting the random prediction confidence threshold when the RSEskip first becomes equal to or exceeds the preset error boundary value, as the prediction confidence threshold.

The RSEskip may be defined as a product of a preset scaling factor, the number of sub-input data whose prediction confidence value is greater than or equal to the prediction confidence threshold among the pieces of sub-input data, and an average absolute gradient of the prediction confidence value.

The average absolute gradient may be defined based on a linear interpolation method for all of confidence intervals of the prediction confidence value.

A learning method for an artificial intelligence model for predicting a label for input data stored in at least one memory, the learning method being performed by an electronic device, includes obtaining a prediction confidence value for the label by performing a forward propagation operation on the input data in units of mini-batch, the mini-batch having "B" pieces of sub-input data included in the input data and "B" being a natural number, performing a backward propagation operation only on sub-input data whose prediction confidence value is equal to or greater than a prediction confidence threshold among the pieces of sub-input data to obtain an approximate weight gradient for a weight of the artificial intelligence model, and updating the weight based on the approximate weight gradient.

The learning method may further include omitting the backward propagation operation for the sub-input data whose prediction confidence value is less than a prediction confidence threshold among the pieces of sub-input data.

The learning method may further include a prediction confidence threshold setting operation of setting the prediction confidence threshold. The prediction confidence threshold setting operation may include operation (a) of initializing a random prediction confidence threshold and RSEskip, the RSEskip being a weight gradient error value according to the omission of the the backward propagation operation, operation (b) of decreasing the random prediction confidence threshold by a specific variation value unit, and calculating the RSEskip whenever the random prediction confidence threshold decreases by the specific variation value unit, operation (c) of repeatedly performing the operation (b) until the RSEskip first becomes equal to or exceeds a preset error boundary value, and operation (d) of setting the random prediction confidence threshold when the RSEskip first becomes equal to or exceeds the preset error boundary value, as the prediction confidence threshold.

The RSEskip may be defined as a product of a preset scaling factor, the number of sub-input data whose prediction confidence value is greater than or equal to the prediction confidence threshold among the pieces of sub-input data, and an average absolute gradient of the prediction confidence value.

The average absolute gradient may be defined based on a linear interpolation method for all of confidence intervals of the prediction confidence value.

The various examples of the present disclosure described above are only some of the preferred examples of the present disclosure, and various examples in which the technical features of various examples of the present disclosure are reflected can be derived and understood by those of ordinary skill in the art based on detailed descriptions to be detailed below.

BRIEF DESCRIPTION OF THE FIGURES

The accompanying drawings are provided to help understanding of various examples of the present disclosure, and various examples of the present disclosure are provided together with the detailed description. However, the technical features of various examples of the present disclosure are not limited to specific drawings, and the features disclosed in each drawing may be combined with each other to constitute a new embodiment. Reference numerals in each drawing refer to structural elements.

The above and other objects and features will become apparent from the following description with reference to the following figures, wherein like reference numerals refer to like parts throughout the various figures unless otherwise specified, and wherein.

DETAILED DESCRIPTION

Figure 1:
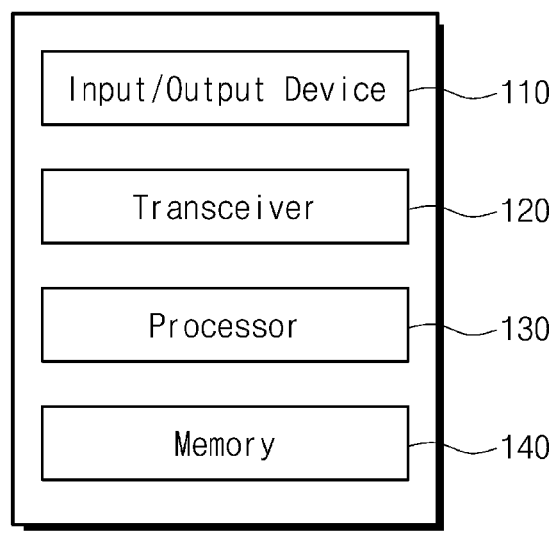
FIG. 1 is a block diagram of an electronic device according to an example of the present disclosure.

Hereinafter, embodiments of the present disclosure will be described in detail with reference to the exemplary drawings. The detailed description set forth below in conjunction with the appended drawings is intended to describe exemplary implementations of the present disclosure and is not intended to represent only implementation forms in which the present disclosure may be practiced. The following detailed description includes specific details to provide a thorough understanding of the present disclosure. However, it will be apparent to one of ordinary skill in the art that the present disclosure may be practiced without these specific details.

In some cases, well-known structures and devices may be omitted or shown in block diagram form focusing on core functions of each structure and device to avoid obscuring the concepts of the present disclosure. In addition, the same reference numerals are used to describe the same components throughout the present disclosure.

Since the various examples according to the concept of the present disclosure can be modified in various ways and have various forms, the various examples will be illustrated in the drawings and described in detail in the present disclosure. However, this is not intended to limit the various examples according to the concept of the present disclosure to a specific form of disclosure, and it should be understood to include all changes, equivalents, or substitutes included in the spirit and scope of the present disclosure.

Terms such as first and/or second may be used to describe various elements, but the elements should not be limited by the terms. The above terms are only for the purpose of distinguishing one component from other components, and a first component may be referred to as a second component, and similarly a second component may also be referred to as a first component, for example, without departing from the scope of claims according to the concept of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Expressions describing the relationship between components, such as "between" and "just between" or "directly adjacent to" should be interpreted as well.

In various examples of the present disclosure, "/" and "," should be construed as indicating "and/or". For example, "A/B" may mean "A and/or B". Furthermore, "A, B" may mean "A and/or B". Furthermore, "A/B/C" may mean "at least one of A, B, and/or C". Furthermore, "A, B, and C" may mean "at least one of A, B and/or C".

In various examples of the present disclosure, "or" should be construed as indicating "and/or". For example, "A or B"

may include "only A", "only B", and/or "both A and B". In other words, "or" should be construed as indicating "additionally or alternatively".

In addition, the terms "unit", "-er", "-or", and "module" described in the various examples of the present disclosure mean units for processing at least one function and operation, and can be implemented by hardware, software, or combinations thereof.

Terms used in the disclosure are used to describe various examples and are not intended to limit the scope of the present disclosure. As used herein, singular forms may include plural forms as well unless the context clearly indicates otherwise. It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present disclosure. Hereinafter, embodiments of the present disclosure will be described in detail with reference to the exemplary drawings.

Electronic Device

In the present disclosure, an electronic device 100 may be for performing a learning operation of an artificial intelligence model that predicts a label with respect to input data. In the present disclosure, for convenience, deep structured learning (DNN), which is referred to as deep learning, is described as an example of an artificial intelligence model, but the artificial intelligence model is not limited thereto and may be a variety of machine learning models.

FIG. 1 is a block diagram of an electronic device according to an example of the present disclosure.

Referring to FIG. 1, the electronic device 100 according to an example of the present disclosure may include an input/output device 110, a transceiver 120, a processor 130, and a memory 140. Here, the input/output device 110 and/or the transceiver 120 may be omitted depending on the implementation method of the electronic device 100.

The input/output device 110 may be various interfaces, auxiliary devices or connection ports for receiving a user input from or outputting information to a user of the electronic device 100. For example, in the present disclosure, the user input may be input data, and the information output to the user may be output data according to the input data and/or an artificial intelligence model. The input/output device 110 may include an input device and an output device. The input device may be a comprehensive concept including various types of input means for detecting or receiving a user input. The output device may be a comprehensive concept including various types of output means for providing various types of data according to the user input.

The transceiver 120 may be connected to the processor 130 and may transmit and/or receive wired/wireless signals. For example, the transceiver 120 may be connected to various user terminals through a wireless communication network. Here, the wired/wireless signal may be input data, output data according to the input data, and/or an artificial intelligence model, and the user terminal may include at least one of a terminal providing input data and a terminal receiving output data according to the input data. Here, the wireless communication network may include a mobile communication network, a wireless LAN, a short-range wireless communication network, and the like. For example, the wireless communication network may include cellular communication using at least one of long-term evolution (LTE), LTE Advance (LTE-A), Code Division Multiple Access (CDMA), wideband CDMA (WCDMA), universal mobile telecommunications system (UMTS) Wireless Broadband (WiBro), or Global System for Mobile Communications (GSM). For example, the wireless communication network may include at least one of wireless fidelity (WiFi), Bluetooth, Bluetooth low energy (BLE), Zigbee, near field communication (NFC), and radio frequency (RF).

The transceiver 120 may include a transmitter and a receiver. The transceiver 120 may be used interchangeably with a radio frequency (RF) unit. The transceiver 120 may transmit/receive various signals to and from the user terminal under the control of the processor 130.

The processor 130 may control the input/output device 110, the memory 140 and/or the transceiver 120, and may be configured to implement the descriptions, functions, procedures, proposals, methods, and/or operational flowcharts of the present disclosure. For example, the processor 130 may receive input data through the input/output device 110 and store the input data in the memory 140. Also, the processor 130 may train an artificial intelligence model according to the input data, and store the trained artificial intelligence model in the memory 140. In addition, the processor 130 may receive a wireless signal through the transceiver 120, and store information included in the wireless signal in the memory 140. In addition, the processor 130 may generate a wireless signal by processing information stored in the memory 140, and then transmit the generated wireless signal through the transceiver 120.

The memory 140 may be connected to the processor 130 and may store various information related to the operation of the processor 130. For example, the memory 140 may store software codes including instructions for performing some or all of processes controlled by the processor 130, or for performing the descriptions, functions, procedures, proposals, methods, and/or operational flowcharts of the present disclosure. Also, the memory 140 may receive input data from the input/output device 110 and store the input data.

Hereinafter, various operation examples of the electronic device 100 will be described. The following various operation examples may be included in the operations of the at least one processor 130 described above.

Figure 2:
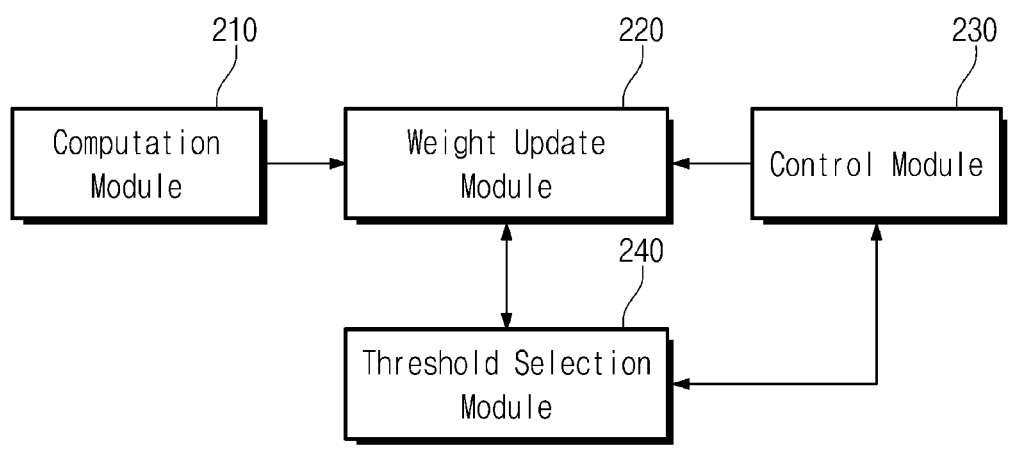
FIG. 2 is a block diagram of modules included in an electronic device according to an example of the present disclosure.
Figure 3:
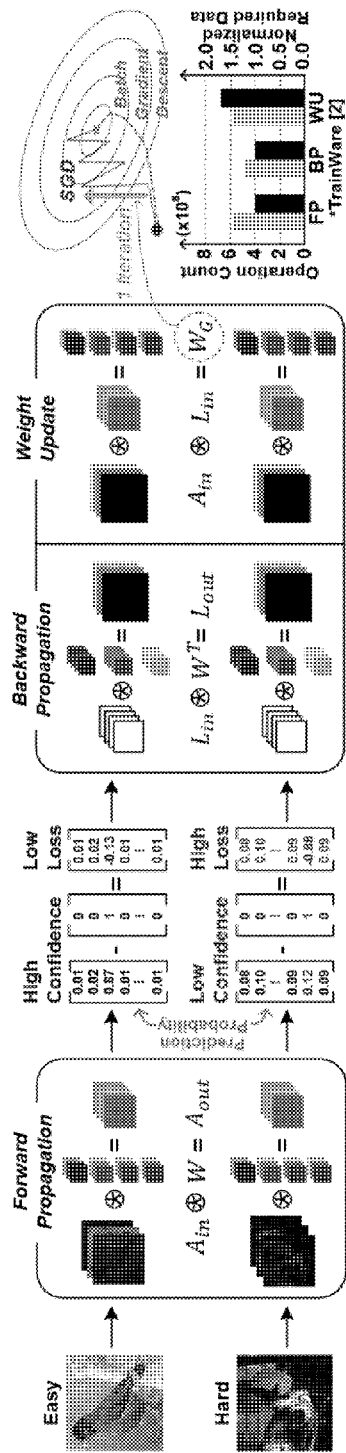
FIG. 3 is a conceptual diagram for describing operations performed by modules included in an electronic device according to an example of the present disclosure.

FIG. 2 is a block diagram of modules included in an electronic device according to an example of the present disclosure, and FIG. 3 is a conceptual diagram for describing operations performed by modules included in an electronic device according to an example of the present disclosure.

A plurality of modules illustrated in FIG. 2 may be computer codes or one or more instructions implemented to cause a physical configuration of the electronic device 100 (e.g., the processor 130, the memory 140, or the like) to perform a specified operation. That is, the plurality of modules may be functional components stored in the memory 140 in the form of computer codes, and when executed, cause the processor 130 to perform a specified operation. In other words, various operations performed by the plurality of modules of FIG. 2 may be operations performed by the processor 130.

Referring to FIG. 2, the electronic device 100 may include a computation module 210, a weight update module 220, a control module 230, and a threshold selection module 240.

The computation module 210 may perform a forward propagation operation and a backward propagation operation to perform a learning operation of an artificial intelligence model that predicts a label with respect to input data.

Referring to FIG. 3, the forward propagation operation may refer to an operation of calculating and storing variables in order from an input layer to which input data of the artificial intelligence model is input to an output layer. For example, when a plurality of layers are included in the artificial intelligence model, the forward propagation operation may perform a first convolution computation ($A_{out}=A_{in} \circledast W$) for each layer. Here, $A_{in}$ denotes input activation, $A_{out}$ denotes output activation, and W denotes a weight.

According to the forward propagation operation, a prediction confidence value and a loss value for the input data may be computed. For example, the prediction confidence value may be computed for each label, and the loss value may be computed based on the prediction confidence value and the ground truth.

The backward propagation operation may refer to an operation of computing a gradient while propagating a loss backward with respect to parameters of the artificial intelligence model. For example, the backward propagation operation may perform a second convolution computation ($L_{out}=L_{in} \circledast W^T$) for each layer. Here, $L_{in}$ may denote an input loss gradient, and Lout may denote an output loss gradient.

Although a third convolution computation ($W_G=A_{in} \circledast L_{in}$) for each layer is illustrated in FIG. 3 as being performed by the weight update module 220, the third convolution computation may also be performed in the backward propagation operation. Here, $W_G$ may be a weight gradient.

The computation module 210 may perform the aforementioned forward propagation operation and/or backward propagation operation on input data in units of mini-batch. Here, the mini-batch is a unit having "B" pieces of sub-input data included in the input data, and "B" may be a natural number (e.g., a multiplier of 2) as the batch size.

For example, the computation module 210 may obtain a prediction confidence value for a label by performing a forward propagation operation in units of mini-batch.

The computation module 210 may compare the prediction confidence value of the sub-input data of the mini-batch with a prediction confidence threshold. According to a result of the comparison, the computation module 210 may perform the backward propagation operation only on sub-input data whose prediction confidence value is equal to or greater than the prediction confidence threshold among the pieces of sub-input data. In other words, the computation module 210 may omit the backward propagation operation with respect to the sub-input data whose prediction confidence value is less than the prediction confidence threshold among the pieces of sub-input data. In this disclosure, a weight gradient obtained when the backward propagation operation is omitted for some sub-input data may be referred to as an approximate weight gradient. That is, the computation module 210 may omit the backward propagation operation for some sub-input data according to the comparison of the prediction confidence value and the prediction confidence threshold, and obtain an approximate weight gradient for the weight of the artificial intelligence model.

The weight update module 220 may update a weight based on the weight gradient obtained from the computation module 210 or the approximate weight gradient. For example, when the backward propagation operation is not omitted for some sub-input data, the weight may be updated based on the weight gradient, and when the the backward propagation operation is omitted, the weight may be updated based on the approximate weight gradient.

The weight update module 220 may update the weight based on a stochastic gradient descent (SGD) algorithm. For example, the weight update module 220 may update the weight by subtracting a value obtained by multiplying the weight gradient or the approximate weight gradient by a learning rate from an existing weight.

The weight update module 220 may obtain $G_{high}$ and $G_{low}$ used to compute an average absolute gradient, which will be described later, through weight update. Here, $G_{high}$ is the cumulative of absolute values of weight gradients in the highest confidence interval, and $G_{low}$ is the cumulative of absolute values of weight gradients in the lowest confidence interval. In this case, the weight update module 220 may obtain $G_{high}$ only in a first epoch interval, using that the computation result of computation of accumulating the absolute values of the weight gradients of the high confidence interval is constant throughout the entire learning process, and omit computation of the $G_{high}$ in the remaining epoch intervals.

The control module 230 may set at least one of various parameters used in the computation module 210 and the weight update module 220, for example, a batch size, a prediction confidence interval for a prediction confidence value, an error boundary value, and an epoch, or control the computation module 210 and the weight update module 220 through the parameters. Here, the epoch is a weight update period.

The threshold selection module 240 may dynamically sets a prediction confidence threshold that is a reference for omitting the backward propagation operation. Hereinafter, the operation of the threshold selection module 240 will be described in detail with reference to FIGS. 4 and 5.

Figure 4:
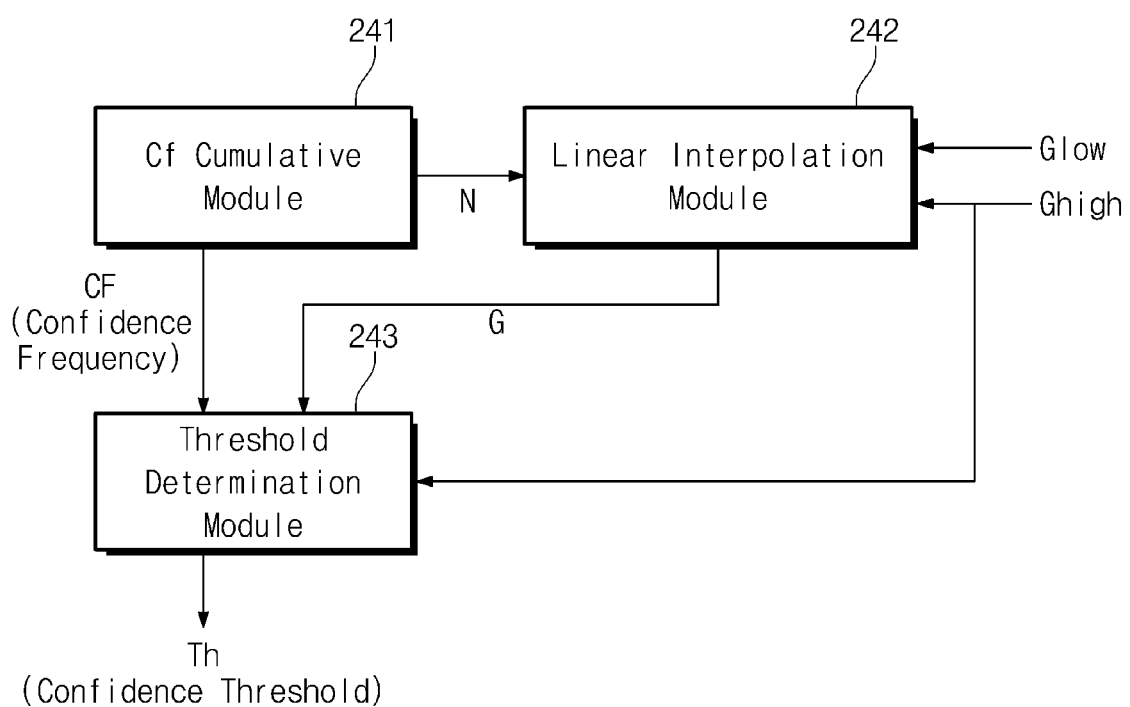
FIG. 4 is a block diagram of a threshold selection module according to an example of the present disclosure.

FIG. 4 is a block diagram of a threshold selection module according to an example of the present disclosure;

Referring to FIG. 4, the threshold selection module 240 according to an example of the present disclosure may include a CF cumulative module 241, a linear interpolation module 242, and a threshold determination module 243.

The CF cumulative module 241 may accumulate a confidence distribution for a confidence interval based on a prediction confidence value. For example, the confidence distribution may be accumulated for each confidence interval for all epochs for input data.

The linear interpolation module 242 may calculate an average absolute gradient based on the linear interpolation method. The absolute value of the weight gradient may have a linear characteristic when being accumulated for each confidence interval. The linear interpolation module 242 may calculate the average absolute gradient using only the cumulative of absolute values of weight gradients in the lowest confidence interval and the highest confidence interval by using the linear characteristic of the absolute value of the weight gradient.

For example, the linear interpolation module 242 may calculate the average absolute gradient based on $$G_{high} + \sum\nolimits_{k \geq Th}^{N} \frac{G_{low} - G_{high}}{N-1}(N-k).$$

Here, $G_{high}$ may be the cumulative of absolute values of weight gradients in the highest confidence interval, $G_{low}$ may be the cumulative of absolute values of weight gradients in the lowest confidence interval, "N" may be the number of confidence intervals, and Th may be a prediction confidence threshold.

The threshold determination module 243 may dynamically determine a threshold based on the cumulative of the confidence distribution and average absolute gradient.

Specifically, the threshold determination module 243 may initialize a random prediction confidence threshold and RSEskip. Here, RSEskip is a weight gradient error value according to the omission of the backward propagation operation, and may be defined as a product of a preset scaling factor, the number of sub-input data whose a prediction confidence value is greater than or equal to the prediction confidence threshold among pieces of sub-input data, and the average absolute gradient of the prediction confidence value. Here, the number of sub-input data whose the prediction confidence value is equal to or greater than the prediction confidence threshold among the pieces of sub-input data may be defined by $\Sigma_{k \geq Th}^{N} CF(k)$, and $CF(k)$ may be the cumulative of the confidence distribution.

The threshold determination module 243 may decrease the random prediction confidence threshold in the units of a specific variation value, and calculate RSEskip whenever the random prediction confidence threshold decreases in the units of the specific variation value. Here, the specific variation value may be a preset value.

The threshold determination module 243 may repeatedly perform the operation of decreasing the random prediction confidence threshold in the unit of a specific variation value and calculating RSEskip whenever the random prediction confidence threshold decreases in the unit of the specific variation value, until RSEskip first becomes equal to or exceeds a preset error boundary value.

The threshold determination module 243 may finally set the random prediction confidence threshold when RSEskip first becomes equal to or exceeds the preset error boundary value, as the prediction confidence threshold.

Figure 5:
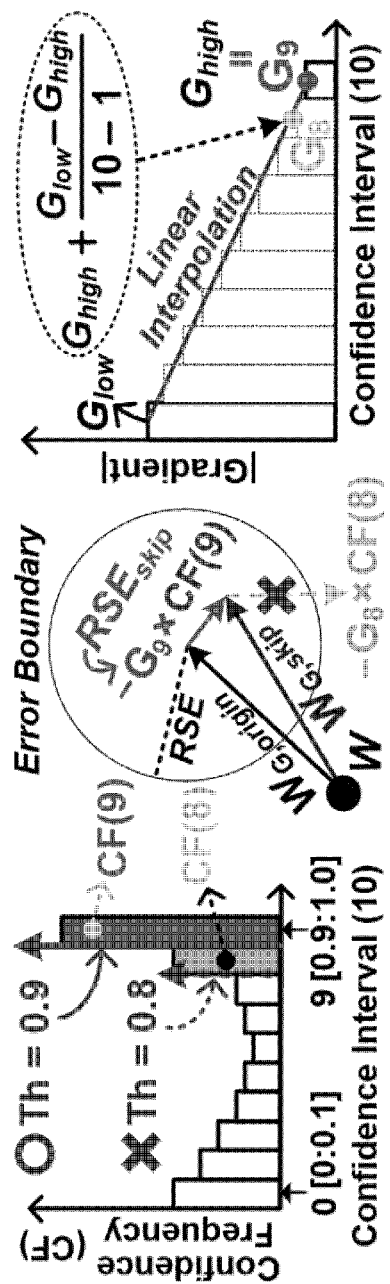
FIG. 5 is a conceptual diagram for describing an operation performed by a threshold selection module according to an example of the present disclosure.

FIG. 5 is a conceptual diagram for describing an operation performed by a threshold selection module according to an example of the present disclosure.

Referring to FIG. 5, a confidence distribution may be accumulated for a confidence interval (e.g., 0 to 9) by the CF cumulative module 241. In this case, each confidence interval may have a range according to the number of confidence intervals.

Based on the accumulated confidence distribution, the threshold determination module 243 may determine whether RSEskip becomes equal to or exceeds a preset error boundary value. For example, when the prediction confidence threshold is 0.9, the RSEskip may be calculated for the cumulative of a confidence distribution of 0.9 or more, and it may be determined whether the calculated RSEskip is equal to or exceeds the preset error boundary value.

In this case, the average absolute gradient used to obtain the RSEskip may be obtained by the linear interpolation module 242. For example, the linear interpolation module 242 may obtain an average absolute gradient by applying a linear interpolation method to all of the confidence intervals (e.g., 0 to 9).

According to the electronic device 100 of the present disclosure described above, it is determined that the weight gradient obtained through the backward propagation operation (and/or weight update) does not significantly contribute to learning when the prediction confidence value is greater than the prediction confidence threshold, omitting the backward propagation operation (and/or weight update) can save learning time and learning energy. In addition, the prediction confidence threshold may be dynamically set according to an allowable noise level.

Learning Method

Hereinafter, a learning method performed by the electronic device 100 according to various examples of the present disclosure will be described. Detailed descriptions of parts overlapping with those described above will be omitted.

Figure 6:
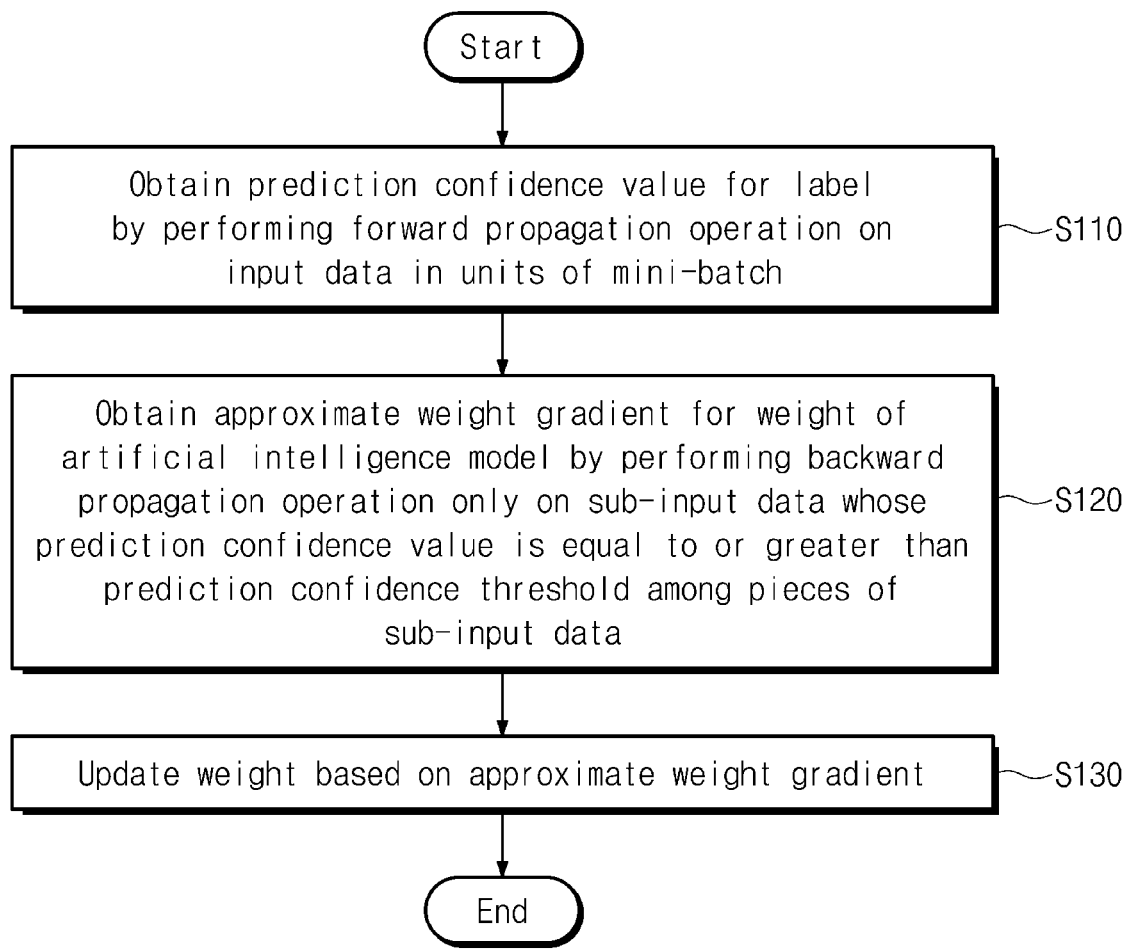
FIG. 6 is a flowchart of a learning method according to an example of the present disclosure.

FIG. 6 is a flowchart of a learning method according to an example of the present disclosure.

Referring to FIG. 6, in S110, the electronic device 100 may perform a forward propagation operation on input data in units of mini-batch to obtain a prediction confidence value for a label. Here, the mini-batch may have "B" pieces of sub-input data included in the input data, and "B" is a natural number.

In S120, the electronic device 100 may perform a backward propagation operation only on sub-input data whose prediction confidence value is equal to or greater than the prediction confidence threshold among the pieces of sub-input data to obtain an approximate weight gradient for the weight of the artificial intelligence model. Here, the backward propagation operation for the sub-input data whose prediction confidence value is less than the prediction confidence threshold among the pieces of sub-input data may be omitted.

In S130, the electronic device 100 may update a weight based on the approximate weight gradient.

Figure 7:
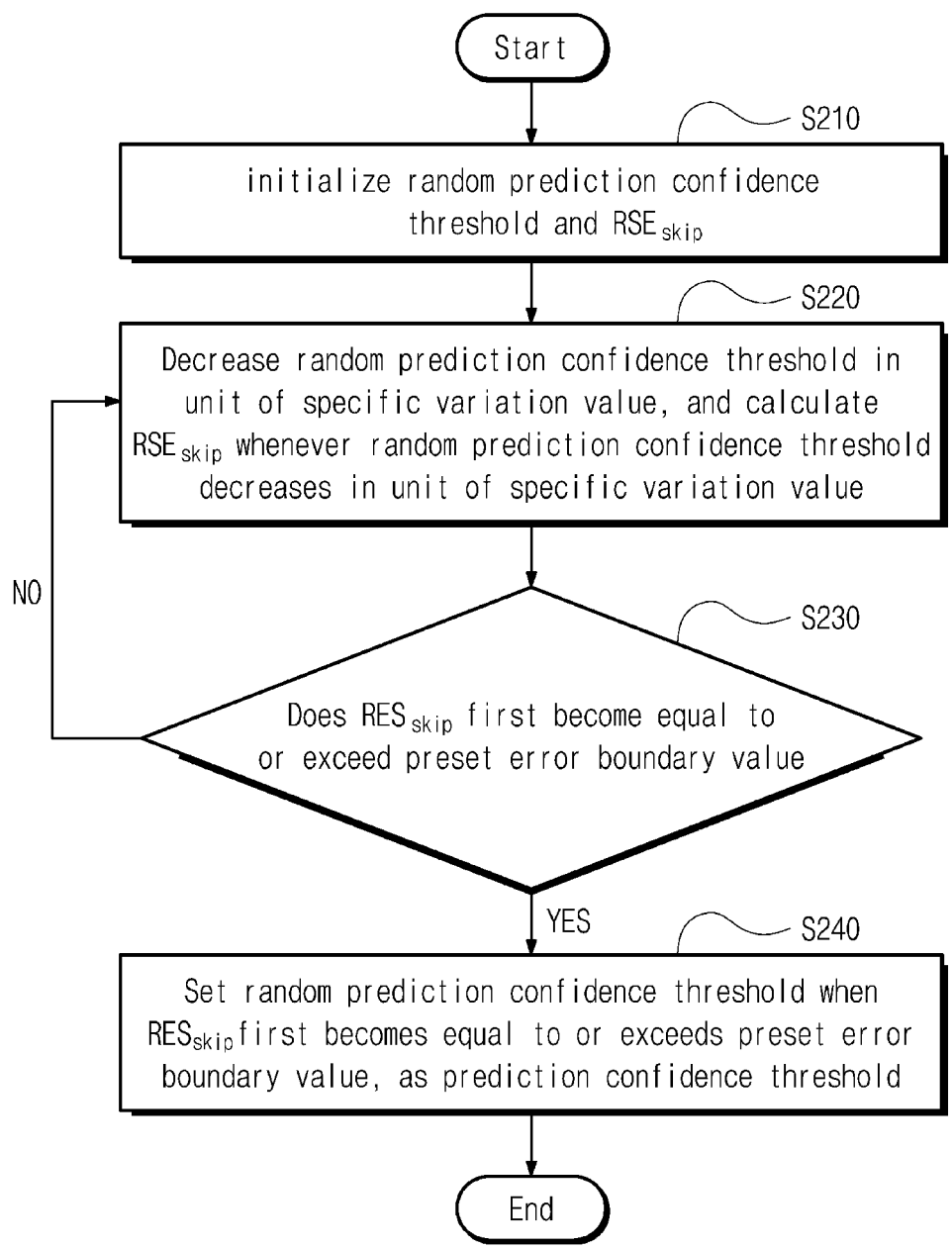
FIG. 7 is a flowchart of a method of setting a prediction confidence threshold included in a learning method according to an example of the present disclosure.

FIG. 7 is a flowchart of a method of setting a prediction confidence threshold included in a learning method according to an example of the present disclosure.

In S210, the electronic device 100 may initialize a random prediction confidence threshold and RSEskip. Here, RSEskip is a weight gradient error value according to the omission of the backward propagation operation, and may be defined as a product of a preset scaling factor, the number of sub-input data whose prediction confidence value is greater than or equal to the prediction confidence threshold among pieces of sub-input data, and the average absolute gradient of the prediction confidence value. Here, the average absolute gradient may be defined based on a linear interpolation method for all of confidence intervals of the prediction confidence value.

In S220, the electronic device 100 may decrease the random prediction confidence threshold in the unit of a specific variation value, and calculate RSEskip whenever the random prediction confidence threshold decreases in the unit of the specific variation value.

In S230, the electronic device 100 may determine whether the RSEskip first becomes equal to or exceeds a preset error boundary value, and when the RSEskip does not first become equal to or does not exceed the preset error boundary value, repeatedly perform S220 until the RSEskip first becomes equal to or exceeds the preset error boundary value.

In S240, the electronic device 100 may set the random prediction confidence threshold when RSEskip first becomes equal to or exceeds the preset error boundary value, as the prediction confidence threshold.

Experimental Examples

Hereinafter, experimental examples for parameters used in various examples of the present disclosure described above will be described.

Figure 8:
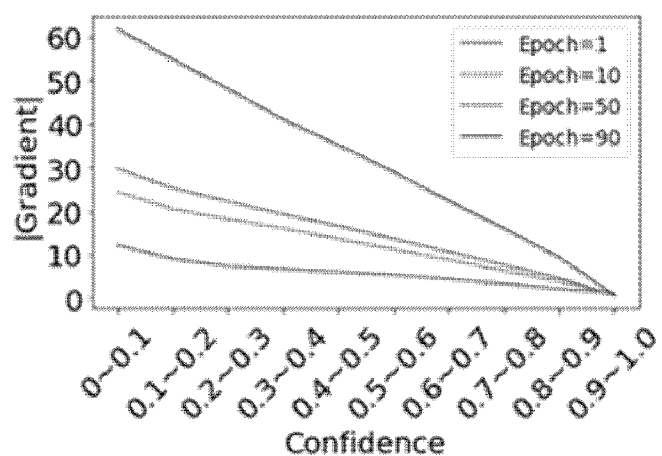
FIG. 8 is a graph illustrating a relationship between a prediction confidence value and an absolute value of a weight gradient according to an example of the present disclosure.
Figure 9:
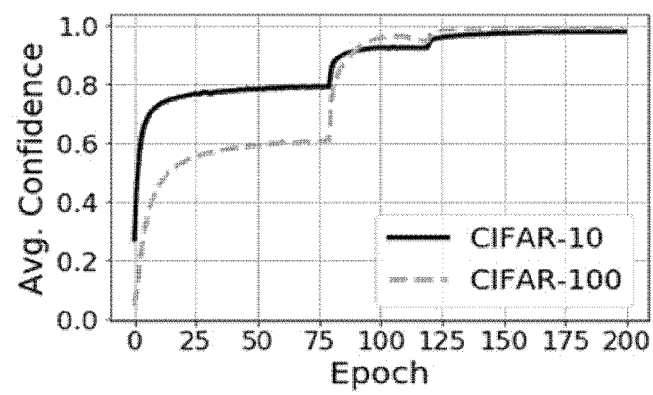
FIG. 9 is a graph illustrating a relationship between an average prediction confidence value and an epoch according to an example of the present disclosure.

FIG. 8 is a graph illustrating a relationship between a prediction confidence value and an absolute value of a weight gradient according to an example of the present disclosure, and FIG. 9 is a graph illustrating a relationship between an average prediction confidence value and an epoch according to an example of the present disclosure.

Referring to FIGS. 8 and 9, the absolute value of the weight gradient may decrease linearly as the prediction confidence value increases regardless of a batch size or epoch, and the average prediction confidence value increases as the epoch increases, irrespective of the type of input data (CIFAR). In this case, the absolute value of the weight gradient rarely occurs when the prediction confidence value is high. Accordingly, the weight update module 220 described above may obtain $G_{high}$ only in a first epoch interval, using that the computation result of computation of accumulating the absolute values of the weight gradients of the high confidence interval is constant throughout the entire learning process, and omit calculation of the $G_{high}$ in the remaining epoch intervals.

Since examples of the proposed method in the above description may also be included as one of the implementation methods of the present disclosure, it is obvious that they may be regarded as a kind of proposed method. In addition, the above-described proposed methods may be implemented independently, but may also be implemented in the form of a combination (or merge) of some of the proposed methods.

The examples of the present disclosure disclosed as described above are provided to enable any person skilled in the art to implement and practice the present disclosure. Although the description has been given with reference to examples of the present disclosure, those skilled in the art may variously modify and change the examples of the present disclosure. Accordingly, the present disclosure is not intended to be limited to the examples set forth herein but is to be accorded the widest scope consistent with the principles and novel features disclosed herein.

According to various examples of the present disclosure, the following effects are obtained.

According to the various examples of the present disclosure, it is possible to reduce the overall learning computation amount and learning energy and minimize influence on learning by omitting computation for the amount of a change in weight for an image having little error (that is, having high prediction confidence) caused by omission of computation within an allowable noise range set by a user, by utilizing the noise-tolerant nature of learning through mini-batch gradient descent.

In addition, the user may adjust the degree of omission of the amount of change in weight by selecting the dynamic prediction confidence threshold.

Effects that can be obtained from various examples of the present disclosure are not limited to the effects mentioned above, and other effects that are not mentioned are clearly derived and understood by those of ordinary skill in the art based on the detailed description below.

While the present disclosure has been described with reference to exemplary embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An electronic device, comprising:
at least one processor; and
at least one memory operatively coupled to the at least one processor to store at least one instruction for causing the at least one processor to perform operations,
wherein the operations include performing a learning operation of an artificial intelligence model that predicts a label with respect to input data stored in the at least one memory,
wherein the learning operation comprises:
obtaining a prediction confidence value for the label by performing a forward propagation operation on the input data in units of mini-batch, the mini-batch having "B" pieces of sub-input data included in the input data and "B" being a natural number;
obtaining an approximate weight gradient for a weight of the artificial intelligence model based on performing a backward propagation operation only on sub-input data whose prediction confidence value is equal to or greater than a prediction confidence threshold among the pieces of sub-input data; and
updating the weight based on the approximate weight gradient.

2. The electronic device of claim 1, wherein the learning operation includes omitting the backward propagation operation for the sub-input data whose prediction confidence value is less than the prediction confidence threshold among the pieces of sub-input data.

3. The electronic device of claim 2, wherein the learning operation includes a prediction confidence threshold setting operation of setting the prediction confidence threshold,
wherein the prediction confidence threshold setting operation comprises:
operation (a) of initializing a random prediction confidence threshold and RSEskip, the RSEskip being a weight gradient error value according to the omission of the backward propagation operation;
operation (b) of decreasing the random prediction confidence threshold by a specific variation value unit, and calculating the RSEskip whenever the random prediction confidence threshold decreases by the specific variation value unit;
operation (c) of repeatedly performing the operation (b) until the RSEskip first becomes equal to or exceeds a preset error boundary value; and
operation (d) of setting the random prediction confidence threshold when the RSEskip first becomes equal to or exceeds the preset error boundary value, as the prediction confidence threshold.

4. The electronic device of claim 3, wherein the RSEskip is defined as a product of a preset scaling factor, the number of sub-input data whose prediction confidence value is greater than or equal to the prediction confidence threshold among the pieces of sub-input data, and an average absolute gradient of the prediction confidence value.

5. The electronic device of claim 4, wherein, the average absolute gradient is defined based on a linear interpolation method for all of confidence intervals of the prediction confidence value.

6. A learning method for an artificial intelligence model for predicting a label for input data stored in at least one memory, the learning method being performed by an electronic device, the learning method comprising:
obtaining a prediction confidence value for the label by performing a forward propagation operation on the input data in units of mini-batch, the mini-batch having "B" pieces of sub-input data included in the input data and "B" being a natural number;

obtaining an approximate weight gradient for a weight of the artificial intelligence model based on performing a backward propagation operation only on sub-input data whose prediction confidence value is equal to or greater than a prediction confidence threshold among the pieces of sub-input data; and updating the weight based on the approximate weight gradient.

7. The learning method of claim 6, further comprising omitting the backward propagation operation for the sub-input data whose prediction confidence value is less than the prediction confidence threshold among the pieces of sub-input data.

8. The learning method of claim 7, further comprising:
a prediction confidence threshold setting operation of setting the prediction confidence threshold,
wherein the prediction confidence threshold setting operation includes:
operation (a) of initializing a random prediction confidence threshold and RSEskip, the RSEskip being a weight gradient error value according to the omission of the backward propagation operation;
operation (b) of decreasing the random prediction confidence threshold by a specific variation value unit, and calculating the RSEskip whenever the random prediction confidence threshold decreases by the specific variation value unit;
operation (c) of repeatedly performing the operation (b) until the RSEskip first becomes equal to or exceeds a preset error boundary value; and
operation (d) of setting the random prediction confidence threshold when the RSEskip first becomes equal to or exceeds the preset error boundary value, as the prediction confidence threshold.

9. The learning method of claim 8, wherein the RSEskip is defined as a product of a preset scaling factor, the number of sub-input data whose prediction confidence value is greater than or equal to the prediction confidence threshold among the pieces of sub-input data, and an average absolute gradient of the prediction confidence value.

10. The learning method of claim 9, wherein the average absolute gradient is defined based on a linear interpolation method for all of confidence intervals of the prediction confidence value.

* * * * *